Sept. 28, 1948.  L. A. BASHARA  2,450,075
BURR-CUTTING TOOL
Filed June 16, 1944

LAURENCE A. BASHARA.
INVENTOR.

BY Oltsch & Knoblock
Attorneys.

Patented Sept. 28, 1948

2,450,075

UNITED STATES PATENT OFFICE 2,450,075

BURR-CUTTING TOOL

Laurence A. Bashara, Portage Township,
St. Joseph County, Ind.

Application June 16, 1944, Serial No. 540,613

3 Claims. (Cl. 77—73)

This invention relates to a burr-cutting tool.

The machining of metal parts, and particularly non-ferrous metal parts, frequently results in the formation of burrs at the mouths of bores, passages, channels and grooves. Such burrs must be removed if the machined part is exposed to liquid flow in use or is used in a machine having moving parts. For this purpose tools of the construction illustrated in my co-pending application, Ser. No. 498,470, filed August 14, 1943, patented October 3, 1944, Patent No. 2,359,607, may be used efficiently and effectively in most instances. Some instances occur, however, where the burrs are so located that two separate operations may be required to remove burrs at a given point. For example, when a non-ferrous metal part is bored, some of the burrs resulting from the operation may project inwardly of the mouth of the bore and others may project outwardly from the face of the part around the mouth of the bore, so that it is necessary to scrape both the interior of the bore and the face of the part by separate operations which may necessitate the use of different tools. The primary object of the present invention is to provide a tool by means of which burrs so located and positioned at the mouth of a bore or circular opening may be removed by one simple, rapid and easily performed operation.

A further object is to provide a tool having a cutting head so shaped that it projects into the mouth of the bore of a work piece with complementary portions thereof engaging diametrically opposed portions of said mouth at an angle thereto which permits rotation of the tool and cutting of all burrs occurring at said mouth regardless of how the burrs are positioned relative to said mouth.

A further object is to provide a tool having a configured cutting head presenting two complementary portions extending in opposite complementary angular relation to the shank of the tool and engageable with opposite portions of the mouth of a circular opening when the tool shank is substantially aligned with the axis of said opening.

A further object is to provide a tool for removing burrs from the mouths of bores in a work piece so constructed that it will not mar or scratch the surface of the work piece in use.

Other objects will be apparent from the description and appended claims.

Figure 1:
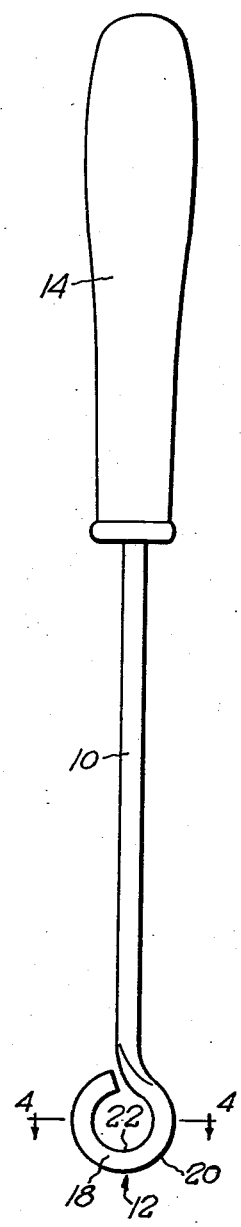
Fig. 1 is a side view of one form of tool embodying my invention.
Figure 2:
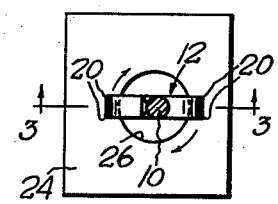
Fig. 2 is an end view, with parts shown in section, illustrating the manner in which the tool is used.
Figure 3:
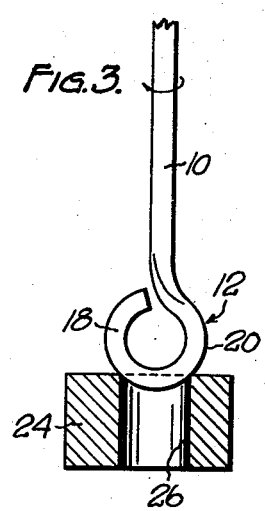
Fig. 3 is a fragmentary side view illustrating the application of the tool to a work piece.
Figure 4:
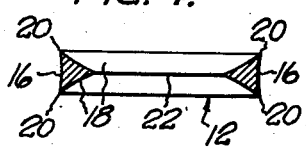
Fig. 4 is an enlarged transverse sectional view taken on line 4—4 of Fig. 1.

Referring to the drawing, and particularly to Figs. 1 to 4 thereof, the numeral 10 designates the elongated rigid shank of the tool which has head portion 12 formed at one end thereof and which mounts a handle 14 at its opposite end. The cutting head 12 is formed integrally with the shank and is bent circularly substantially 360 degrees. Shank 10 is substantially radially positioned with relation to head 12. As best illustrated in Fig. 4, the tool is of triangular cross sectional shape at the head 12, with the faces thereof transversely concave or hollow ground. The outermost face 16 of the head is substantially cylindrical and its inner faces 18 are conical, thereby providing a pair of complementary outer cutting edges 20 of the same radius and a central inner edge 22. Only the outermost semi-circular portions of the outer edges 20 need to be sharp for most uses of the tool.

In use, the tool is positioned with its head 12 in engagement with work piece 24 at the mouth of bore 26 therein. The shank 10 is positioned substantially in alignment with the axis of bore 26. Thus the two cutting edges 22 each engage the work piece at the mouth of the bore at two places, and a portion of the tool head projects into the bore to center the tool while the tool is pressed firmly thereagainst. The tool is preferably supplied in sets, the heads of the tools in the sets being of graduated radii. For any given size of bore a tool is selected from the set which will engage the opposite edges of the bore at points thereof substantially 90° apart. In other words, it is preferable to use a tool having a head of such size that a tangent to each point of contact with the work will be substantially 45° displaced from both the face of the work piece and the axis and wall of the bore, but observance of this relationship exactly is not essential as long as it is at least roughly approximated. When the tool is rotated while held in this position, as by holding and turning the tool with one hand, while holding the work piece with the other hand, all burrs at the mouth of the bore are removed, regardless of whether they project into the bore or outwardly from the face of the work piece around the bore. It will be apparent that the tool will be self-centering, and that the leading cutting edges will be diametrically opposed regardless of the direction of rotation thereof, thus simplifying and facilitating use of the tool. Also, by reason of the construction of the tool and the manner in which it is used, scratching and marring of the surfaces of the work piece is avoided. The advantages of the rotative manipulation, self-centering, tool control, and rapidity of operation of this tool, as compared to the use of a scraping type of tool having a straight blade or a blade curved or bent not more than 90° from the shank in one direction only, are particularly valuable in practice.

Figure 5:
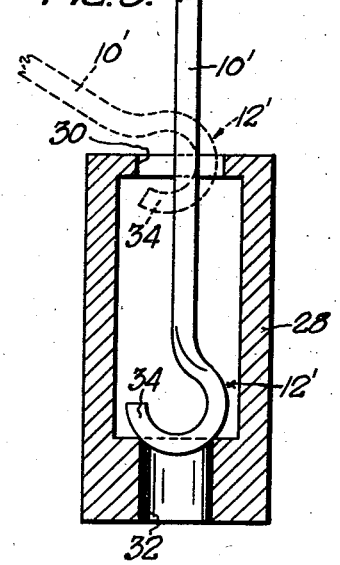
Fig. 5 is a fragmentary side view of a modified embodiment to the invention illustrating its application to a work piece of a character to which the Fig. 1 embodiment would not be applicable.

A modified embodiment of the invention is illustrated in Fig. 5, and involves the formation of cutting head 12' of arcuate hook shape substantially 270° in extent. The shank 10' of this tool extends radially relative to the head 12', as in the preferred embodiment. The manipulation and use of this tool is the same as in the preferred embodiment. The advantage of this embodiment is that the tool may be inserted for use in hollow work pieces through an access hole of a radius smaller than the radius of head 12'. For example, if a hollow work piece 28 has bores 30 and 32 at opposite ends which are substantially aligned and both of about the same diameter, the tool can be used to cut burrs at the inner mouths of said bore where the same would naturally occur as the result of a boring operation. As shown in dotted lines, the tool can be inclined to insert the free end portion 34 of its head through bore 30 by a sidewise bodily movement of the tool, whereupon the tool can be swung to a position parallel to the bore while simultaneously moving the remainder of the head through bore 30. In this way the tool head is inserted into the hollow cavity of the work piece, whereupon it may be lowered to engage the inner mouth of the bore 32 for rotative manipulation thereat to cut burrs as above described.

Figure 6:
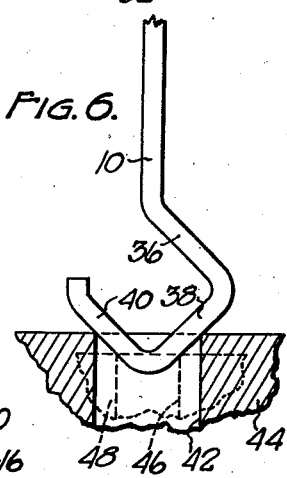
Fig. 6 is a fragmentary side view of another modified embodiment of the invention and its application to a work piece.

Fig. 6 illustrates another embodiment of the invention wherein the tool head is bent laterally from shank 10 at 36 and is provided with a V-shaped cutting portion comprising substantially straight blade portions 38 and 40 extending substantially at right angles to each other and each substantially equi-angularly related to the axis of shank 10. The cross section of each of the blade portions 38 and 40 and the arrangement of the cutting edges will preferably be the same as illustrated in Fig. 4. This embodiment of the tool may be used in the same manner described above. The principal advantage of the straight angularly disposed blade portions is that one tool may be used for removing burrs from bores of different sizes within a range determined by the lengths of the blade portions. This range of use is illustrated in Fig. 6 where its application to the bore 42 of work piece 44 is illustrated in full lines, while its application on a smaller bore 46 of a work piece 48 is illustrated in dotted lines.

Figure 7:
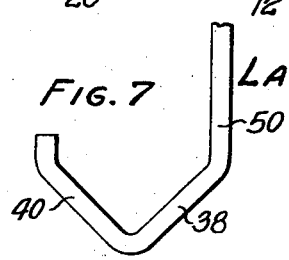
Fig. 7 is a fragmentary side view of another modified embodiment of the invention.

While it is preferred, in each embodiment, that the shank shall be substantially aligned with the axis of the bore at which it is being used in order to facilitate rotation thereof about its axis rather than bodily movement thereof in a circular path, such positioning of the shank relative to the cutting head is not essential. An alternative relation of the shank to the cutting head, wherein the shank merges directly with the angular blade portion 38, is illustrated in Fig. 7. Also, it is not essential that two outer cutting edges be provided as shown in Fig. 4 since only one of said outer edges need be ground or sharpened.

I claim:

1. In a tool for removing burrs from the mouth of a circular opening in a machined metal part, an elongated body comprising a shank and a cutting head integral with said shank, said cutting head being circularly bent through slightly less than 360° and having at least one cutting edge at its outer periphery adapted to engage substantially diametrically opposed portions of the mouth of said opening, said head and shank lying in a common plane and said shank extending substantially radially relative to said head.

2. In a tool for removing burrs from the mouth of a circular opening in a machined metal part, an elongated body comprising a shank and a cutting head integral with said shank, said cutting head being circularly bent through at least 180° and less than 360° in a plane common to said shank and having a triangular cross section throughout presenting two similar cutting edges at opposite sides of its outer periphery.

3. In a tool for removing burrs from the mouth of a circular opening in a machined metal part, an elongated body comprising a shank and a hook shaped cutting head bent circularly in an arc of substantially 270 degrees and having a cutting edge at its outer periphery, said shank lying in the plane of said head and extending substantially radially therefrom.

LAURENCE A. BASHARA.

REFERENCES CITED

The following references are of record in the file of this patent:

UNITED STATES PATENTS

| Number | Name | Date |
|---|---|---|
| 644,595 | Grabler | Mar. 6, 1900 |
| 841,332 | Lehnert | Jan. 15, 1907 |

FOREIGN PATENTS

| Number | Country | Date |
|---|---|---|
| 244,584 | Germany | Mar. 13, 1912 |